UNITED STATES PATENT OFFICE.

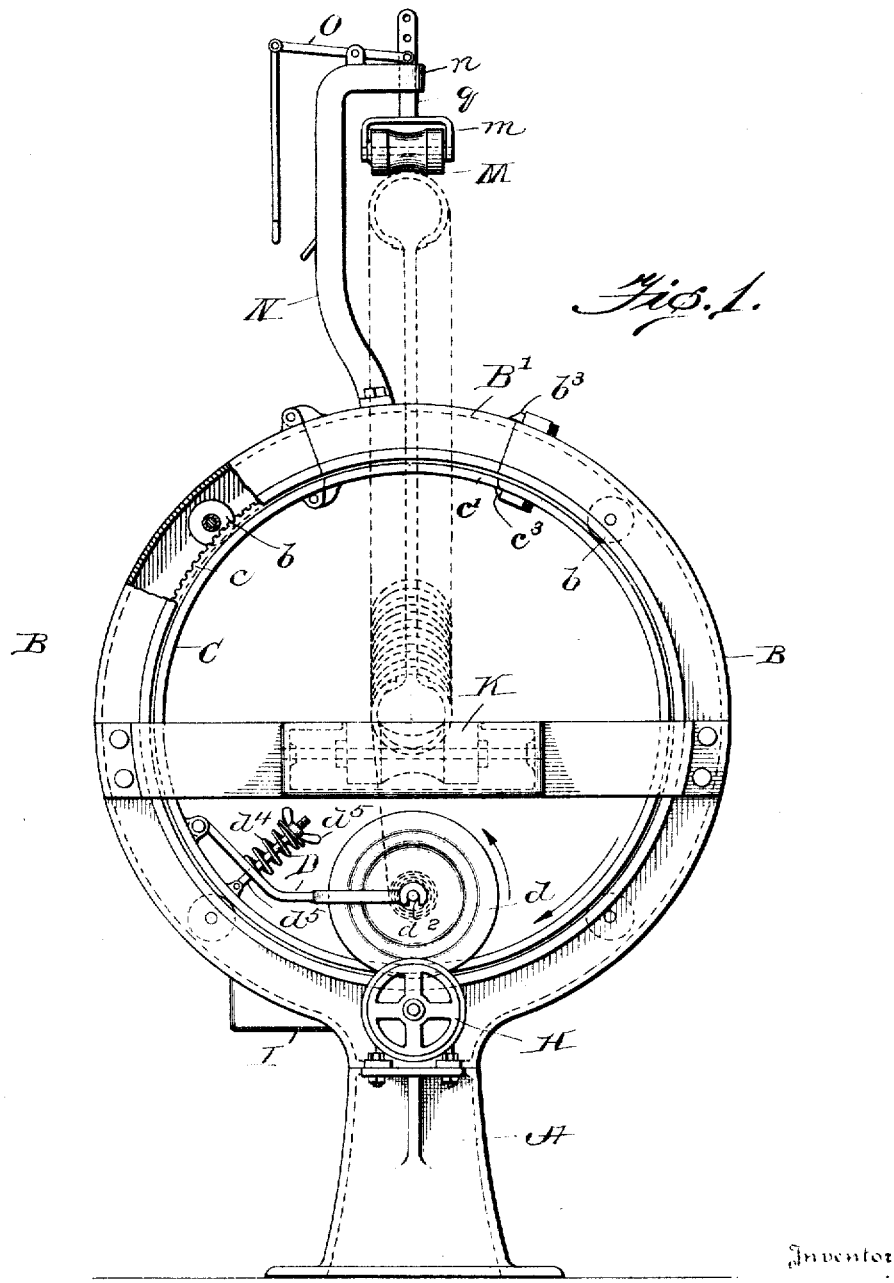

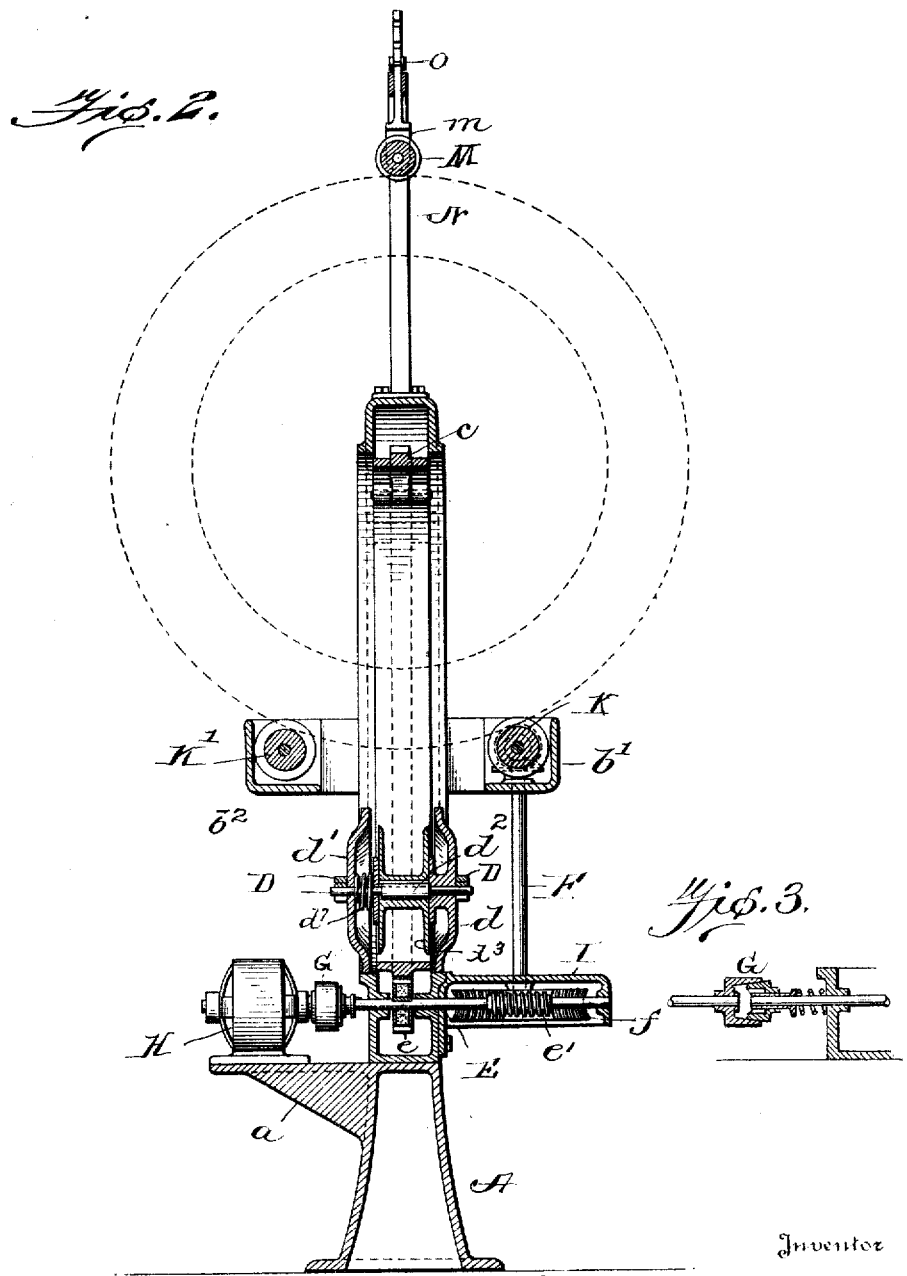

CHARLES BROWN, OF KNOXVILLE, TENNESSEE, ASSIGNOR OF ONE-THIRD TO BENJAMIN F. LIVELY AND ONE-THIRD TO FRANK J. LIVELY, BOTH OF LENOIR CITY, TENNESSEE.

TIRE-UNWRAPPING MACHINE.

1,306,098.     Specification of Letters Patent.     Patented June 10, 1919.

Application filed January 7, 1918. Serial No. 210,799.

*To all whom it may concern:*

Be it known that I, CHARLES BROWN, a citizen of the United States, residing at Knoxville, in the county of Knox and State of Tennessee, have invented certain new and useful Improvements in Tire-Unwrapping Machines; and I do hereby declare the following to be a full, clear, and exact description of the invention, such as will enable others skilled in the art to which it appertains to make and use the same.

This invention relates to machines for unwrapping the covering or strips of fabric that are wound upon rubber tire casings or shoes in the manufacture of automobile tires and the like preparatory to vulcanization.

The object of the invention is to provide a simple, inexpensive, efficient and durable machine of the character referred to composed of few parts which are compactly arranged and which may be easily assembled and taken apart for repairs or the renewal of a worn or broken part and by the use of which the removal of the fabric winding from the completed tire after vulcanization may be easily and expeditiously effected and the fabric wrapped upon a spool ready for re-use.

The invention will first be hereinafter more particularly described, with reference to the accompanying drawings, which are to be taken as a part of this specification and then pointed out in the claims at the end of the description.

In said drawings Figure 1 represents a side elevation of an unwrapping machine embodying my invention, a part being broken away, and a tire casing in position to be unwrapped being indicated in dotted lines.

Fig. 2 is a vertical sectional view of the same taken at right angles to the view shown in Fig. 1, Fig. 3 is an end elevation of the machine.

Referring to said drawings, in which the same reference characters or letters are used to denote corresponding parts in different views, the letter A denotes a base portion or standard on which the operating parts of the machine are mounted, and which is formed or provided with a lateral extension or platform $a$, adapted to support an electric motor or other suitable means for imparting motion to the rotating shuttle or ring which carries the spool on which the tape or fabric is wound as it is unwound from the tire casing or shoe. On the standard A is mounted a circular shuttle guide or frame B, which is of U-shaped form in cross section and within which is revolubly mounted a circular spool-carrying ring or shuttle C, for unwinding a fabric strip or tape from a tire casing or shoe arranged to encircle a part of said ring or shuttle and its supporting and guiding frame and adapted to rotate therearound. The ring C has a centrally disposed toothed flange $c$, and to reduce friction its margins bear upon friction rollers $b$, $b$, journaled in the frame B. The spool-carrying ring or shuttle C has pivoted thereto one arm of a forked lever D, the forked end of which straddles a pair of disks $d$, $d^1$, arranged to travel upon the circular frame B, so as to rotate by traveling contact therewith. The forked end of said lever has recessed end-portions arranged to fit over or upon opposite ends of a shaft $d^2$ on the ends of which said disks are journaled. A spool $d^3$ is loosely fitted on said shaft $d^2$ between the disks $d$ and $d^1$ and is provided with end-flanges one of which is in frictional contact with a hub portion of the disk $d$ so as to adapt the spool to rotate with the disk under normal conditions but independently thereof under undue stress or pull of the tape thereon. The disks $d$ and $d^1$ are arranged in rolling contact with the inner circumference of the circular frame B, whereby rotary movement is imparted thereto as the ring C rotates, and they are held in yielding engagement therewith by means of a suitable tension device, which as shown consists of a spring $d^4$, preferably a coiled spring, interposed between the lever D and a nut $d^5$ screwed on the free end of a rod $d^6$ which is pivoted at one end to the inner circumference of the spool-carrying ring or shuttle C and extends therefrom through an aperture in the lever D, so that the spring will force and yieldingly hold, the disks in contact with the circular frame B around which the disks travel, thereby imparting rotary movement to the spool $d^2$. By adjusting the nut $d^5$ the power of the springs $d^4$ may be varied to vary the pressure-contact of the disks upon the circular frame and thereby regulate the tension or pull upon the tape or fabric that is being unwound and removed from the tire casing and wound upon the spool. A spring $d^7$, placed on the spool shaft between one end flange thereof and the adjacent disk $d^1$ exerts a pressure tending to hold the spool in frictional contact with the hub of the disk $d^2$ and cause the spool to rotate with the disk while permitting independent rotary movement of the spool in case of any undue strain upon the tape or fabric. If desired, a positive rotary movement of the disks $d$ and $d^1$ may be assured by providing teeth thereon engaging a toothed surface or portion of the frame B. The rotary ring or shuttle C is positively rotated or driven by engagement of the toothed peripheral flange $c$ thereon with a pinion $e$ fixed on the driving shaft E. The shaft E carries a worm $e^1$ which engages or is in mesh with a worm-wheel $f$ fixed on a vertical shaft F, by which motion is imparted to the tire casing or shoe, as hereinafter described. A clutch G, of ordinary construction, connects one end of the shaft E with one end of the shaft of an electric or other suitable motor H, mounted on the frame extension $a$ for imparting motion to the shuttle and tire; said clutch G having inter-engaging male and female members one of which is spring-pressed toward the other and keyed on the shaft so that it may be slid endwise into and out of frictional engagement with the other member for starting and stopping the rotation of the shaft E at will. The worm-wheel and worm on the shafts E and F may be conveniently housed within a casing I, to protect the same from dust; said housing being of inverted cup-like form, as shown, having a pendant flange adjacent the machine frame for securing it thereto by bolts or rivets, as indicated in Fig. 2. The shaft E extends through the lower portion of the circular frame B and through the housing K, and one end thereof has its bearings in the outer wall of said housing. The upper end of the shaft F has its bearings in a frame-member of cross-piece $b^1$ which is preferably formed of angle iron and bolted or riveted at the opposite ends thereof to opposite sides of the circular frame B. The shaft F has a bevel gear wheel on the upper end thereof in mesh with a similar gear wheel on one end of a grooved roller K which is journaled in the frame-piece $b^1$ and on which the tire casing rests at one side of the circular frame, said casing being supported on the opposite side of said frame by means of a similar grooved roller $K^1$ which is journaled in a cross-bar or frame-member $b^2$ preferably a counterpart of the bar $b$ and having its ends secured to the circular frame on the side thereof opposite said bar $b$. The tire casing or shoe while resting upon the lower grooved rollers K and $K^1$ is held against an upper grooved roller M and is properly supported and guided in its rotary movements between said rollers. The roller M as shown is journaled in the forked ends of a vertically movable bar $m$, which is slidably fitted in a socket or eye formed in a lateral arm or head-portion of a standard N mounted on the circular frame B, said bar $m$ being pivoted to one end of a lever O which is fulcrumed on the standard N, and has depending from its free end a pull rod or other suitable device by which the lever may be operated to raise or lower the roller M when desired to release the tire casing or shoe or place the same in operative position between the three grooved rollers. To permit the insertion of the tire casing or shoe within the rotary shuttle and its supporting and guiding frame B, said frame is provided with a hinged section $B^1$, which may be swung back upon its hinges so as to leave an opening for the admission of the tire casing, and co-incident with said hinged section of the circular frame the spool-carrying ring or shuttle C is provided with a hinged section $c^1$ which may also be thrown back or turned on its hinges to complete the opening through the stationary frame and rotary ring for the admission of the tire or casing. When in closed position the end of the hinged section $B^1$ opposite its hinged connection with the main portion of the circular frame is held fast by a spring-actuated locking bolt or catch $b^3$ slidably fitted in a socket on the circular frame adjacent the gap formed by said hinged section, and so also in closed position the hinged section of the spool-carrying ring or shuttle is held fast by a sliding locking bolt $c^3$, on the adjacent end of the main portion of the ring. The roller-supporting standard N is preferably mounted on the hinged section of the circular frame B, so that when the hinged section of the circular frame is raised or turned on its hinges to provide an opening for the admission or removal of the tire casing or shoe the roller M will be raised and thrown back out of contact with said shoe.

Having thus described my invention, what I claim as new and desire to secure by Letters Patent of the United States is:—

1. A tire unwrapping machine, comprising a stationary circular frame, a ring revolubly mounted in said frame, a pair of disks movable with said ring and rolling upon said frame, an axle supporting said disks, a member pivoted to said ring and engaging said axle, and a tension device engaging said member and pivotally connected with said ring.

2. A tire unwrapping machine, comprising a stationary circular frame, a ring revolubly mounted in said frame, a pair of disks movable with said ring and rolling upon said frame, an axle supporting said disks, a spool revolubly mounted on said axle between said disks, a member pivoted to said ring and engaging said axle, and a tension device engaging said member and pivotally connected with said ring.

3. A tire unwrapping machine, comprising a stationary circular frame, a ring revolubly mounted in said frame, a pair of disks movable with said ring and rolling upon said frame, an axle supporting said disks, a lever pivoted to said ring and provided with a fork straddling said disks and engaging said axle, and a tension device engaging said lever and pivotally connected with said ring.

4. A tire unwrapping machine, comprising a stationary circular frame, a ring revolubly mounted in said frame, a pair of disks movable with said ring and rolling upon said frame, an axle supporting said disks, a lever pivoted to said ring and engaging said axle, and a tension device for regulating the pressure-contact of said disks upon said frame, comprising a rod pivoted, at one end, to said ring and carrying a nut threaded on the other end thereof, and a spring between said lever and nut.

5. A tire unwrapping machine, comprising a stationary circular frame having a closable tire-entrance portion, a ring revolubly mounted in said frame, and having a closable tire-entrance portion, a plurality of rollers for supporting a tire-shoe or casing in a position to encircle a part of said frame and ring, a standard carried by and movable with said closable entrance portion of the frame, a member slidably mounted in said standard and carrying one of said rollers, and means carried by said standard for raising said roller-carrying member to move the roller away from the tire-casing.

6. A tire unwrapping machine, comprising a stationary circular frame having a closable tire-entrance portion, a ring revolubly mounted in said frame and having a closable tire-entrance portion, a plurality of rollers for supporting a tire-shoe or casing in a position to encircle a part of said frame and ring, a standard carried by and movable with said closable entrance portion of the frame, a member slidably mounted in said standard and carrying one of said rollers, and a lever fulcrumed on said standard and pivotally connected with said roller-carrying member for moving the roller away from the tire-casing.

7. A tire unwrapping machine comprising a stationary circular frame having a hinged tire entrance portion, a ring revolubly mounted in said frame, rolling means carried by said ring and engaging said frame so as to adapt said means to be rotated by the rotation of said ring, a spool revolubly mounted on said rolling means, a plurality of rollers journaled in frame members arranged on opposite sides of said circular frame, and a third roller mounted on said hinged portion of said circular frame between which and said first mentioned rollers a tire casing or shoe may be revolubly supported, and means for rotating said ring and shoe.

8. In a tire unwrapping machine in combination a stationary circular frame, a ring revolubly mounted in said frame; rolling means carried by said ring in frictional engagement with said frame to adapt said means to be rotated by the rotation of the ring, a spool revolubly mounted in frictional engagement with said rolling means so as to permit rotation thereof independently of said rolling means, means for supporting and rotating a tire casing or shoe arranged to encircle a part of said circular frame and ring and rotate around said part, and tensioning devices for varying the pressure-contact between said rolling means and frame, together with means for maintaining frictional engagement between said rolling means and spool.

9. In a tire unwrapping machine, a stationary circular frame having a closable tire-entrance portion, a ring revolubly mounted within said circular frame also having a closable tire-entrance portion, a plurality of rollers revolubly mounted in frame members fixed upon opposite sides of said circular frame, a third roller mounted on the closable tire-entrance portion of said circular frame, and means for adjusting said third roller to release or engage and sustain a tire shoe or casing resting upon said plurality of rollers substantially at right angles to and encircling a part of said frame and ring, together with means for rotating one of the last mentioned rollers and the tire-shoe or casing resting thereon.

10. In a tire unwrapping machine, the combination with a stationary circular frame, a ring revolubly mounted in said frame and means for rotating said ring, of a spool and a friction drive therefor comprising rolling means bearing on said frame and on which said spool is mounted in frictional engagement therewith, to adapt the spool to rotate with or independently of said rolling means, means connecting said ring and rolling means, and variable pressure-exerting means acting on said connecting means for varying the pressure-contact between said rolling means and frame.

In testimony whereof I affix my signature in the presence of two witnesses.

CHARLES BROWN.

Witnesses:
 Jno. P. Russell,
 J. O. H. Johnston.